United States Patent [19]

Kawahara

[11] Patent Number: 5,459,512
[45] Date of Patent: Oct. 17, 1995

[54] IMAGE PICKUP APPARATUS WITH AUTOMATIC AND MANUAL EXPOSURE CONTROL

[75] Inventor: Hideo Kawahara, Hatogaya, Japan

[73] Assignee: Canon Kabushiki Kaisha, Tokyo, Japan

[21] Appl. No.: 143,532

[22] Filed: Oct. 26, 1993

Related U.S. Application Data

[63] Continuation of Ser. No. 67,397, May 24, 1993, abandoned, which is a continuation of Ser. No. 787,235, Nov. 4, 1991, abandoned.

[30] Foreign Application Priority Data

Nov. 7, 1990 [JP] Japan ............................ 2-299929

[51] Int. Cl.⁶ ................................................. H04N 5/238
[52] U.S. Cl. ................................................ 348/363; 354/441
[58] Field of Search ................................. 348/207, 362, 348/363; 354/430, 441, 446; H04N 5/225, 5/238, 5/255

[56] References Cited

U.S. PATENT DOCUMENTS

| | | | |
|---|---|---|---|
| 4,471,383 | 9/1984 | Shiono et al. | 358/228 |
| 4,959,728 | 9/1990 | Takahashi et al. | 358/228 |
| 5,057,927 | 10/1991 | Hieda | 358/228 |

FOREIGN PATENT DOCUMENTS

| | | | |
|---|---|---|---|
| 60-66579 | 4/1985 | Japan | H04N 5/235 |
| 61-32671 | 2/1986 | Japan | H04N 5/235 |
| 1-263628 | 10/1989 | Japan | H04N 5/238 |
| 2-65481 | 3/1990 | Japan | H04N 5/238 |
| 3-85876 | 4/1991 | Japan | H04N 5/235 |

*Primary Examiner*—Michael T. Razavi
*Assistant Examiner*—Tuan V. Ho
*Attorney, Agent, or Firm*—Robin, Blecker, Daley & Driscoll

[57] ABSTRACT

A video camera provided with a diaphragm operating speed control circuit for selecting different operating speeds for the diaphragm for exposure control, in automatic exposure control and in manual exposure control.

10 Claims, 3 Drawing Sheets

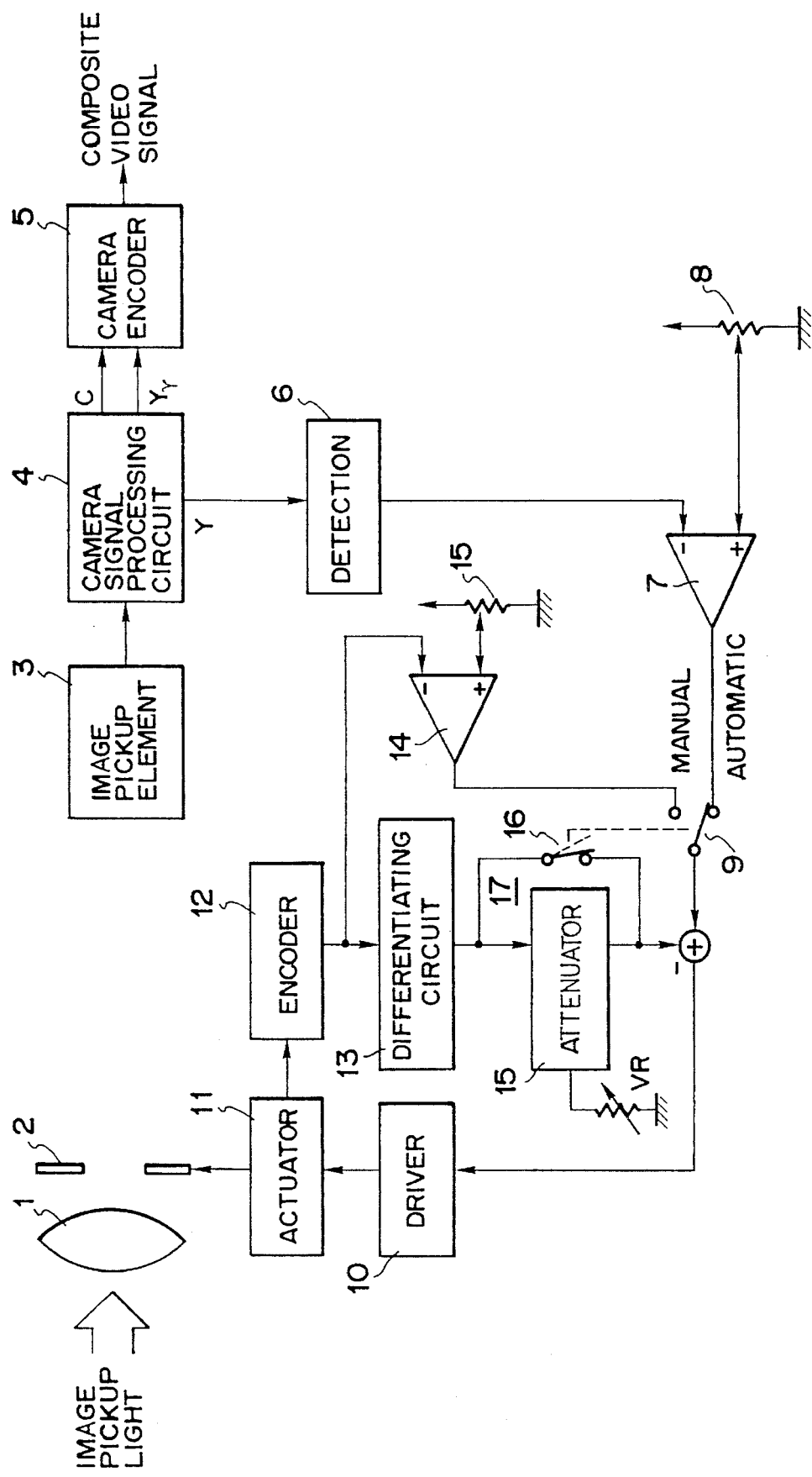

IMAGE PICKUP APPARATUS WITH AUTOMATIC AND MANUAL EXPOSURE CONTROL

This is a continuation application under 37 CFR 1.62 of prior application Ser. No. 08/067,397, filed May 24, 1993 now abandoned which is a continuation application under 37 CFR 1.62 of prior application Ser. No. 787,235, filed Nov. 4, 1991, now abandoned

BACKGROUND OF THE INVENTION

1. Field of the Invention

The present invention relates to an image pickup device capable of automatic exposure control (AE) and manual exposure control.

2. Related Background Art

Recent remarkable advancements in video tape recorders (VTR) and other imaging equipment have reached a stage that image taking equipment such as so-called cam-corders are equipped with automatic exposure control device as a standard feature, and some are even equipped with manual exposure control as an additional feature.

In the following is the conventional exposure control system in such cam-corders, is explained with reference to FIG. 1.

At first, in the automatic exposure control state, the light coming from an object is subjected to an adjustment in quantity by a diaphragm 2 constituting an exposure control mechanism, and is focused on a light receiving face of an image pickup element 3. The object image focused on said image pickup element 3 is photoelectrically converted, and an obtained image signal is supplied to a camera signal processing circuit 4, which effects image processing such as gamma conversion to obtain a color signal C and a luminance signal Yγ as the image signals. These image signals are guided through a camera encoder 5 for example of NTSC format and released to the exterior in the form of a composite image signal.

Also a luminance signal Y released from said camera signal processing circuit 4 is supplied to a detection circuit 6 for generating a control signal for controlling the diaphragm 2 so as to obtain an appropriate exposure according to the luminance of the object. Said detection circuit 6 effects, for example, integration detection of said luminance signal, and compares the integrated signal in an operational amplifier 7 with a reference voltage from a voltage generator 8, and the difference is amplified and supplied to a driver 10. A control signal from said driver 10 controls the diaphragm 2 through an actuator 11 therefor. An output signal of an encoder 12 for detecting the state of the diaphragm 2 is differentiated by a differentiating circuit 13, and is supplied as a negative feedback signal to the driver 10 for controlling this circuit.

In the following, manual exposure control operations are explained. When an exposure operation selector switch 9 is shifted from automatic to manual, the output signal of said encoder 12 for detecting the state of the diaphragm 2 is compared, in an operational amplifier 14 with a reference voltage of a voltage generator 15 for manually setting the diaphragm aperture, and the obtained difference is supplied from said operational amplifier 14 to the driver 10 of the above-explained diaphragm driving circuit. The control is conducted in a similar manner as in the automatic exposure control explained above, so as that the output voltage of the encoder 12 becomes equal to the reference voltage of the voltage generator 15, whereby the output of image pickup element 3 becomes constant.

In such an image pickup device capable of automatic and manual exposure control, in which the operation of the actuator for controlling the diaphragm is determined by a feedback circuit involving an encoder, since somewhat strong feedback is adopted for reaching a stabilized state within a certain operation time, in order to achieve a smooth diaphragm control operation in the automatic exposure control, the manual exposure control is conducted with a safe feedback rate as in the automatic exposure control. For this reason, in the automatic exposure control state, the diaphragm requires a long driving time, thus being unable to regulate the aperture with satisfactory response, and incapable of smooth diaphragm regulating operation.

In the field of exposure control, the present applicant already made certain proposals for example in the U.S. patent applications Ser. No. 484,539 filed Feb. 23, 1990 and Ser. No. 393,644 filed Aug. 14, 1989.

SUMMARY OF THE INVENTION

In consideration of the foregoing, the object of the present invention is to provide an image pickup device capable of regulating the diaphragm aperture with satisfactory response and achieving the diaphragm regulating operation in smooth manner, even in case of manual exposure control.

The above-mentioned object can be attained, according to a preferred embodiment of the present invention, by an image pickup device comprising speed control means for switching the operating speed of the diaphragm for exposure control between the automatic mode and the manual mode, and being capable of varying the diaphragm operating speed between the automatic exposure control and the manual exposure control, whereby the diaphragm aperture can be regulated with satisfactory response in the manual exposure control, with a diaphragm operating speed different from that in the automatic exposure control.

Other objects of the present invention, and the features thereof, will become fully apparent from the following description, which is to be taken in conjunction with the attached drawings.

BRIEF DESCRIPTION OF THE DRAWINGS

FIG. 3 is a block diagram of another embodiment of the present invention.

DETAILED DESCRIPTION OF THE PREFERRED EMBODIMENTS

Figure 1:
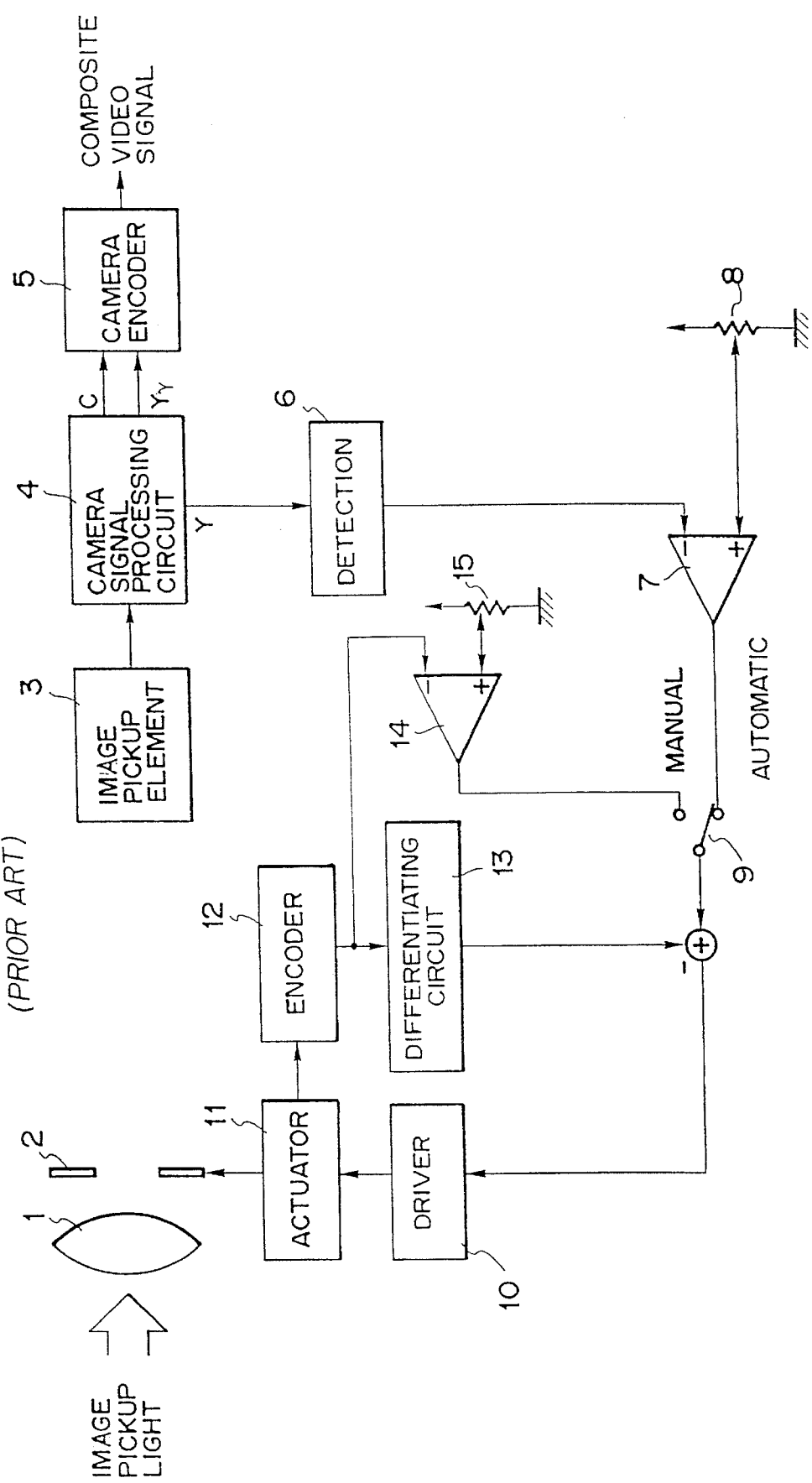
FIG. 1 is a block diagram of a conventional image pickup device.
Figure 2:
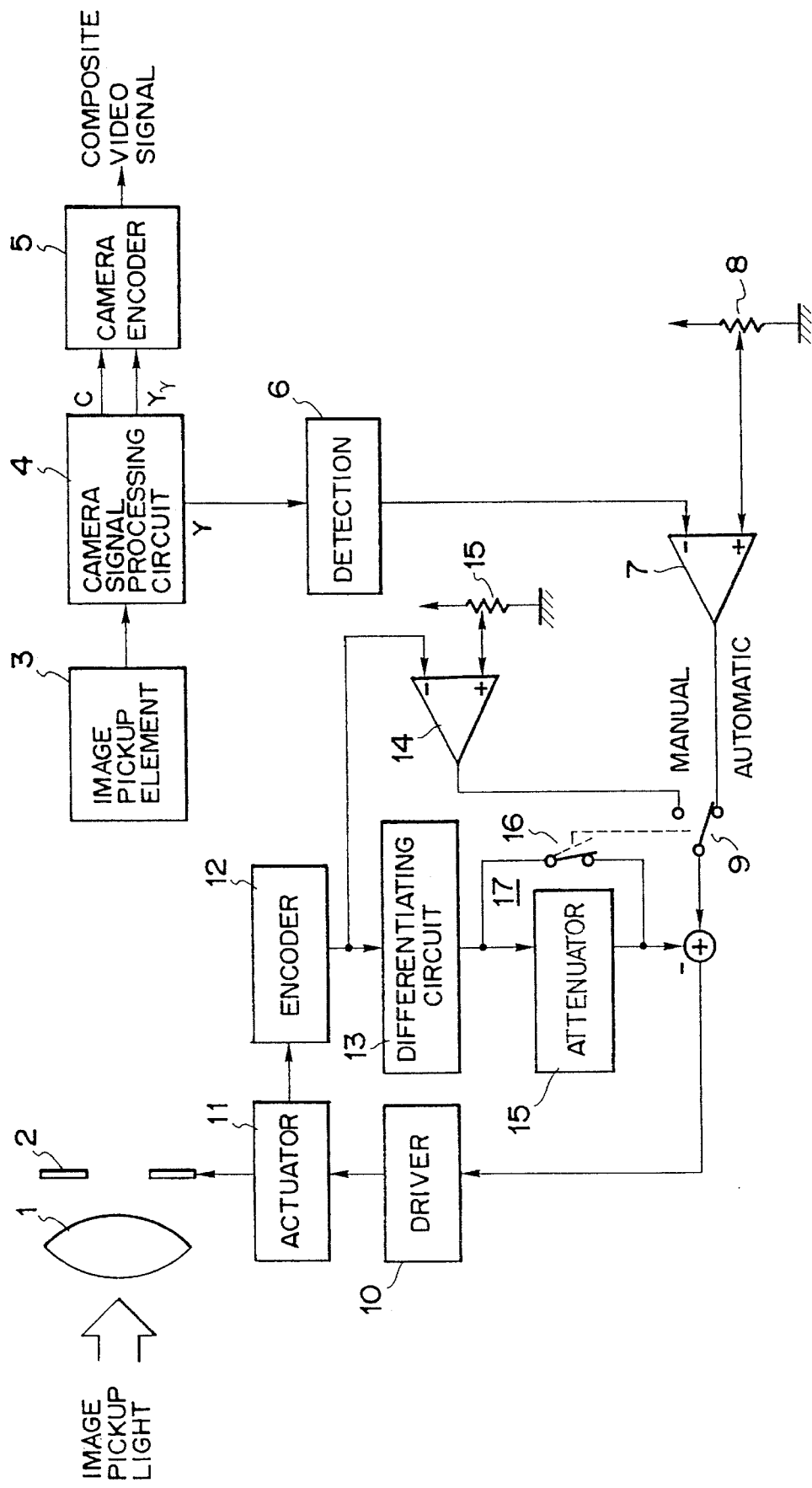
FIG. 2 is a block diagram of an image pickup device constituting an embodiment of the present invention.

FIG. 2 is a block diagram of an image pickup device constituting an embodiment of the present invention, wherein same components as those in FIG. 1 are represented by same numbers. There are illustrated a lens optical system 1 receiving the light from an object; a diaphragm 2 for exposure control, for controlling the amount of incident light; an image pickup element 3 receiving the light with controlled amount; a camera signal processing circuit 4 for processing the image signal from the image pickup element 3 to release the color signal C and the luminance signal Yγ; a camera encoder 6 for converting the output signals of the camera signal processing circuit 4 into a composite image signal; a detection circuit 6 for detecting the luminance signal γ released from the camera signal processing circuit 4 and composed for example of an integrating circuit; an operational amplifier 7 for comparing the output of the detection circuit 6 with the reference voltage from a voltage generator 8 for automatic exposure control and amplifying the difference; an exposure control selecting switch 9 for selecting automatic or manual exposure control; a driver 10 for driving the diaphragm 2 through an actuator 11; an encoder 12 for detecting the aperture of the diaphragm 2; a differentiating circuit 13 for differentiating the output of the encoder 12; an operational amplifier 14 for comparing the output of the encoder 12 with the reference voltage of a voltage generator 15 for manual exposure control and amplifying the difference; an attenuator 15 for attenuating a feedback signal for diaphragm control released from the differentiating circuit 13; a feedback rate selecting switch 16 positioned between the input and output terminals of the attenuator 15 and linked with the exposure control selecting switch 9; and diaphragm operating speed control means 17 consisting of the attenuator 15 and the feedback rate selecting switch 16 and serving to select different diaphragm operating speeds in the automatic exposure control and in the manual exposure control.

In the following there will be explained the function of the above-explained circuit.

In the automatic exposure control mode, the exposure control selecting switch 9 is set at the automatic side, and the feedback rate selecting switch 16 is simultaneously closed to shortcircuit the input and output terminals of the attenuator 15. In this state the control is conducted in the same manner as in the automatic exposure control shown in FIG. 1, whereby achieved is smooth automatic exposure control.

In the manual exposure control mode, the exposure control selecting switch 9 is shifted to the manual side, and the feedback rate selecting switch 9 is simultaneously opened. In this state, the feedback signal, released from the encoder 12 and transmitted through the differentiating circuit 13, is fed back to the driver 10 after attenuation by the attenuator 15. Consequently the feedback rate is made lower than in the automatic exposure control state, whereby the diaphragm 2 operates faster in a shorter time. Thus the diaphragm aperture can be regulated with improved response, and the diaphragm control becomes smooth also in the manual exposure control.

As explained in the foregoing, the present invention is featured by the presence of diaphragm operating speed control means which selects different diaphragm operating speeds in the automatic exposure control and in the manual exposure control, whereby diaphragm aperture control with satisfactory response and smooth diaphragm regulating operation can be achieved in the manual exposure control, as in the automatic exposure control.

In the foregoing embodiment, the switch 16 is closed to shortcircuit the attenuator 15 when the switch 9 is at the automatic side, but such configuration is not limitative. It is also possible to vary the amount of attenuation of said attenuator between the automatic and manual exposure control states.

It is furthermore possible, as shown in FIG. 3, to regulate the response speed of the diaphragm by rendering the amount of attenuation variable by means of a variable resistor VR.

What is claimed is:

1. An image pickup device comprising:

a) a diaphragm for controlling an amount of incident light;

b) drive means for driving said diaphragm by a driving signal, said driving means including a feedback loop of the driving signal of said diaphragm;

c) attenuating means inserted in said feedback loop for variably changing a feedback rate of said feedback loop; and d) switch means for varying a drive speed of said diaphragm by said drive means by changing the feedback rate of said feedback loop by controlling an attenuating value of said attenuating means, between an automatic exposure control state and a manual exposure control state, said switch means activating said attenuating means in the manual exposure control state and short-circuiting said attenuating means in the automatic exposure state.

2. An image pickup device according to claim 1, wherein said switch means is adapted to select a higher diaphragm driving speed in the manual exposure control state than in the automatic exposure control state.

3. An image pickup device according to claim 2, wherein said drive means includes an encoder for detecting an aperture value of the diaphragm, and forms said feedback loop for feeding the aperture value, released from said encoder, back as diaphragm control information, and said switch means is adapted to switch the feedback value in said feedback loop.

4. An image pickup device according to claim 1, further comprising image pickup means for converting an optical image, entered through said diaphragm, into an electrical signal, wherein said drive means is adapted, in said automatic exposure control state, to drive said diaphragm in such a manner that the level of said electrical signal becomes constant.

5. A video camera comprising:

(a) a diaphragm for controlling an amount of incident light;

(b) image pickup means for converting optical image information, incident through said diaphragm, into an electrical signal;

(c) drive means capable of driving said diaphragm in an automatic exposure control mode and a manual exposure control mode, said drive means having a feedback loop for driving said diaphragm;

(d) attenuating means inserted in said feedback loop, for variably changing a feedback rate of said feedback loop; and (e) control means for controlling said drive means so as to vary a response characteristic of said diaphragm by changing the feedback rate of said feedback loop by controlling an attenuating value of said attenuating means, between the automatic exposure control mode and the manual exposure control mode, said control means enabling said attenuating means in the manual exposure control mode and shortcircuiting said attenuating means in the automatic exposure control mode.

6. A video camera according to claim 5, wherein said control means is adapted to select a faster response characteristic in the manual exposure control mode than in the automatic exposure control mode.

7. A video camera according to claim 6, wherein said drive means includes an encoder for detecting an aperture of said diaphragm and forms said feedback loop for feeding the aperture value, released from said encoder, back as diaphragm control information, and said control means is adapted to vary a feedback value in said feedback loop, according to the control mode.

8. A video camera according to claim 7, further comprising regulation means for regulating the attenuating value of said attenuating means.

9. An image pickup device comprising:
a) image pickup means;
b) a diaphragm for controlling an amount of incident light on said image pickup means;
(c drive means for driving said diaphragm with a feedback loop for a driving signal of said diaphragm, said feedback loop having an attenuator for controlling a feedback rate of said feedback loop;
(d) mode selection means for selectively switching between a manual mode in which said diaphragm is manually controlled and an automatic mode in which said diaphragm is automatically controlled; and
(e) control means for, in response to said mode selection means, controlling a drive response of said diaphragm by changing an attenuating value of said attenuator to change the feedback rate of said feedback loop, said control means shortcircuiting said attenuator when the response of said diaphragm is made more rapid.

10. A device according to claim 9, wherein said control means makes response of said diaphragm more rapid by reducing said feedback rate when said mode selection means selects said manual mode, and makes the response of said diaphragm slower by increasing said feedback rate when said mode selection means selects said automatic mode.

* * * * *